(12) United States Patent
Pratt (10) Patent No.: US 6,261,042 B1
(45) Date of Patent: Jul. 17, 2001

(54) QUICK-RELEASE FASTENER SYSTEM (75) Inventor: John D. Pratt, Laguna Niguel, CA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 09/430,722

(22) Filed: Oct. 29, 1999

Related U.S. Application Data (60) Provisional application No. 60/106,848, filed on Nov. 3, 1998.

(51) Int. Cl.$^7$ .................................................. F16B 21/00
(52) U.S. Cl. ..................... 411/551; 411/552; 411/553; 411/999
(58) Field of Search ...................... 411/551, 553, 411/552, 550, 549, 352, 999, 301, 302

(56) References Cited

U.S. PATENT DOCUMENTS

| | | | |
|---|---|---|---|
| 3,015,870 | * | 1/1962 | Ely .......................... 411/552 |
| 3,222,744 | * | 12/1965 | Dellith . |
| 3,449,004 | * | 6/1969 | Anderson . |
| 3,480,311 | * | 11/1969 | Lanham . |
| 3,564,563 | * | 2/1971 | Trotter ..................... 411/552 |
| 3,709,086 | * | 1/1973 | Johnson ................... 411/551 |
| 3,967,875 | | 7/1976 | Stanaitis . |
| 4,274,460 | | 6/1981 | Egner . |
| 4,310,273 | | 1/1982 | Kirrish . |
| 4,661,030 | * | 4/1987 | Delmastero .............. 411/552 |
| 4,897,004 | | 1/1990 | Norton . |
| 4,904,133 | | 2/1990 | Wright . |
| 5,152,648 | | 10/1992 | Pratt . |
| 5,429,464 | | 7/1995 | Eshraghi . |
| 5,511,301 | | 4/1996 | McGuire . |
| 5,580,204 | | 12/1996 | Hultman . |
| 5,692,865 | | 12/1997 | Pratt . |
| 5,743,691 | | 4/1998 | Donovan . |
| 5,800,022 | | 9/1998 | Del Rosario . |
| 5,884,923 | | 3/1999 | Pratt . |
| 5,938,384 | | 8/1999 | Pratt . |
| 5,941,539 | | 8/1999 | Pratt . |

\* cited by examiner

*Primary Examiner*—Flemming Saether
(74) *Attorney, Agent, or Firm*—Trexler, Bushnell, Giangiorgi, Blackstone & Marr, Ltd.

(57) ABSTRACT

A quick-release fastener system for attaching a first structural body to a second structural body. The quick-release fastener system includes a stud assembly that is engaged with the first structural body and a receptacle assembly that is engaged with the second structural body. The stud assembly includes a stud and a nut body engaged with the stud. The receptacle assembly includes a retaining clip, and a biasing member and receptacle which are engaged with the retaining clip. The stud includes a receptacle-engaging portion which engages the receptacle, and the nut body is engaged with the stud such that rotation of the nut body effects rotation of the receptacle-engaging portion of the stud in the receptacle. The biasing member contacts the stud and biasing the receptacle-engaging portion of the stud into engagement with the receptacle. The engagement between the receptacle-engagement portion of the stud and the receptacle effects attachment of the first structural body to the second structural body.

11 Claims, 5 Drawing Sheets

QUICK-RELEASE FASTENER SYSTEM

RELATED APPLICATION

This application claims the benefit of United States Provisional Application Ser. No. 60/106,848, filed on Nov. 3, 1998.

BACKGROUND

The present invention generally relates to quick-release fasteners, and more specifically relates to a fastener system for use in quickly and easily attaching or securing one structural body to another, such as for quickly and easily attaching a panel to aircraft structure.

A typical panel fastener system includes a fastener having a head, a shank, and a threaded portion formed on the shank opposite the head. The threaded portion is engageable with a corresponding threaded nut. For example, in the case where the fastener system is used to secure or attach a panel to an aircraft structure, the nut is secured on the aircraft structure where the panel is to be attached. To install the fastener and attach the panel, the fastener is inserted through an aperture in the panel, and then the threaded portion of the shank is engaged with the nut thereby securing the panel in position. Prevailing (locking) torque helps the fastener resist loosening under vibration. Typically, several fasteners are employed to secure a panel in place on an aircraft. This is especially true in cases where the panel is large and/or is load-carrying.

One of the problems with prior art fastener systems is that by providing that the threaded portion of the shank must be threadably re-engaged with the nut each time the fastener is attached or installed, there is a tendency for the prevailing locking torque between the parts to become worn. In other words, the life cycle of prior art fastener systems is often limited by how many cycles it takes for the locking torque between the shank and the nut to become reduced to unacceptably low values.

Additionally, prior art fastener systems provide that the shank must be rotated several times, such as 6–10 times, with respect to the nut in order to fully install the fastener system. This process is generally time consuming and tedious, especially so if the process must be repeated for several fasteners.

Another problem with the prior art fastener systems is that they typically include numerous, loose components, including at least the fastener and a separate nut. Many prior art fastener systems which are not captive fasteners provide that once the fastener has been released to remove one structural body from another, the fastener can readily fall away. For example, in the case of a panel on an aircraft where the panel pivots downward upon the one or more fasteners being disengaged from the aircraft body, the fasteners can readily fall to the floor. This is not only inconvenient, but can result in losing a fastener thereby further increasing the time to effect the re-attachment of the panel.

Yet still another problem with those prior art fastener systems which are not hold-out fasteners is that when, for example, a panel is removed or pivoted generally away from the aircraft body, the fasteners, even if they do remain on the panel, pivot slightly due to gravity and are not generally aligned relative to the nut to allow for the easy re-installation of the fasteners to re-attach the panel. The fact that the fasteners can pivot with respect to, for example a panel, after the fasteners are released may provide that as the panel is re-aligned for re-attachment, the fasteners are not aligned with their respective nuts.

OBJECTS AND SUMMARY

An object of an embodiment of the present invention is to provide a quick-attach, quick-release fastener system.

Another object of an embodiment of the present invention is to provide a fastener system which has a relatively long life cycle.

Still another object of an embodiment of the present invention is to provide a fastener system which is captive, yet does not include a large number of loose components.

Still yet another object of an embodiment of the present invention is to provide a fastener system that includes a fastener which can be manipulated such that the fastener generally remains aligned with one or corresponding components of the system.

Briefly, and in accordance with at least one of the foregoing objects, an embodiment of the present invention provides a quick-release fastener system for attaching a first structural body to a second structural body. The quick-release fastener system includes a stud assembly that is engaged with the first structural body and a receptacle assembly that is engaged with the second structural body. The stud assembly includes a stud and a nut body engaged with the stud. The receptacle assembly includes a retaining clip, and a biasing member and receptacle which are engaged with the retaining clip. The stud includes a receptacle-engaging portion which engages the receptacle, and the nut body is engaged with the stud such that rotation of the nut body effects rotation of the receptacle-engaging portion of the stud in the receptacle. The biasing member contacts the stud and biasing the receptacle-engaging portion of the stud into engagement with the receptacle. The engagement between the receptacle-engagement portion of the stud and the receptacle effects attachment of the first structural body to the second structural body.

The present invention provides a quick release fastener which is particularly useful in applications such as attaching a panel to an aircraft. Of course, there are many, many other applications which would benefit from a fastener which is in accordance with the present invention.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Shown in the FIGURES is a fastener assembly 10 which is in accordance with an embodiment of the present invention. Specifically, FIGS. 1–5 illustrate a fastener assembly 10 which is in accordance with an embodiment of the present invention, and the remaining FIGURES illustrate components of the fastener assembly 10 illustrated in FIGS. 1–5. While the fastener assembly 10 will be described hereinbelow, still other embodiments are possible while remaining within the scope of the present invention.

Assembly 10 provides for quick and easy installation and removal while also providing relatively substantial clamping forces after being installed. Additionally, the assembly 10 provides as such while minimizing several small components, providing increased life (i.e. many reuse cycles) and reducing operation time because threaded portions of the assembly 10 need not be dis-engaged and re-engaged during each installation (i.e. only a partial rotation is needed instead of 6–10 rotations as required by the prior art). Still other advantages would be recognized by one having ordinary skill in the art, and some of these will be identified later herein.

Figure 3:
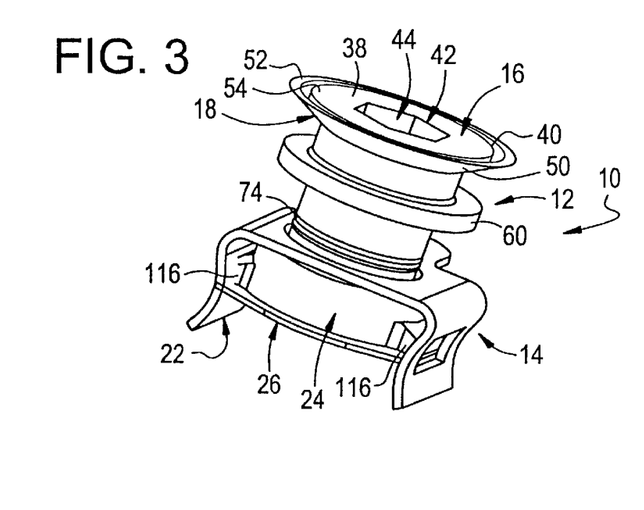
FIG. 3 is a top, perspective view, similar to FIG. 2 but from a different angle, of the fastener assembly illustrated in FIG. 1, showing the fastener assembly operatively assembled.
Figure 4:
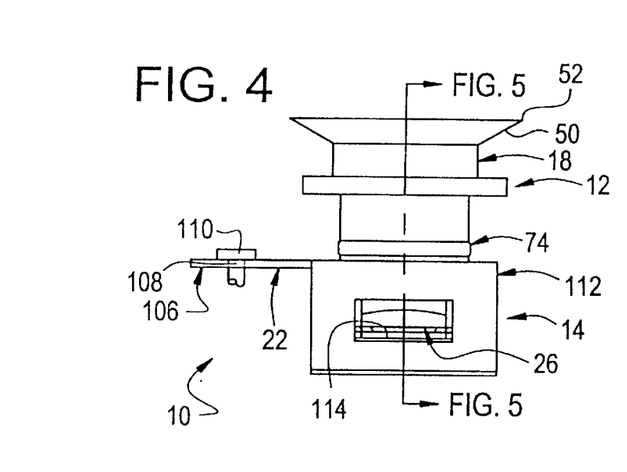
FIG. 4 is a side, elevational view of the fastener assembly illustrated in FIG. 1, showing the fastener assembly operatively assembled.
Figure 5:
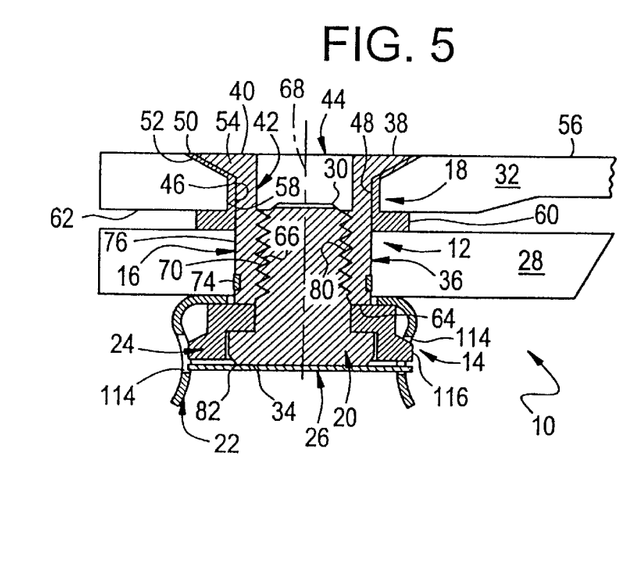
FIG. 5 is a side, cross-sectional view, taken along line 5—5, of the fastener assembly illustrated in FIG. 4, showing the fastener assembly operatively assembled with two workpieces.

The fastener assembly illustrated in FIGS. 1–5 consists of a stud assembly 12 (see FIGS. 2–5) and a receptacle assembly 14. The stud assembly 12 includes a nut body 16, a retainer 18, and a stud 20, and may also include a retaining member 74 on the nut body 16, which will be discussed later herein. The receptacle assembly 14 includes a retaining clip 22, a receptacle 24, and preferably also a biasing member 26. As shown in FIG. 5 and as will be described more fully later herein, the retaining clip 22 is secured to a first structural body 28 such as to an aircraft structure, and retains both the receptacle 24 and the biasing member 26. The nut body 16 is threaded onto one end 30 of the stud 20, and the nut body 16 is received in the retainer 18 which is retained on a second structural body 32, such as on a panel which is to be attached to or proximate to the first structural body 28 such as the aircraft structure. Therefore, the receptacle assembly 14 is secured to the first structural body 28, such as to an aircraft structure, and the stud assembly 12 is retained on the second structural body 32, such as on a panel which is to be attached to the aircraft structure.

During installation or employment of the assembly 10 to fasten the structural bodies 28 and 32 together, the stud assembly 12 is engaged with the receptacle assembly 14. Specifically, a keeper end 34 of the stud 20 is engaged in the receptacle 24, and the nut body 16 is rotated to cause the stud 20 threaded thereon to rotate in the receptacle 24 (because of prevailing torque between the two) and become secured therein. The act of securing the stud 20 in the receptacle 24 is shown in the progression from FIGS. 6 through 9. Full securement of the stud 20 in the receptacle 24 after installation is shown in FIGS. 2–5 and in FIG. 9. Because the nut body 16 initially threads onto the stud 20, and then subsequently the nut body 16 is not entirely threadably disengaged therefrom during removal of the stud assembly 12 from the receptacle assembly 14, the life of the assembly 10 is greatly extended.

Figure 1:
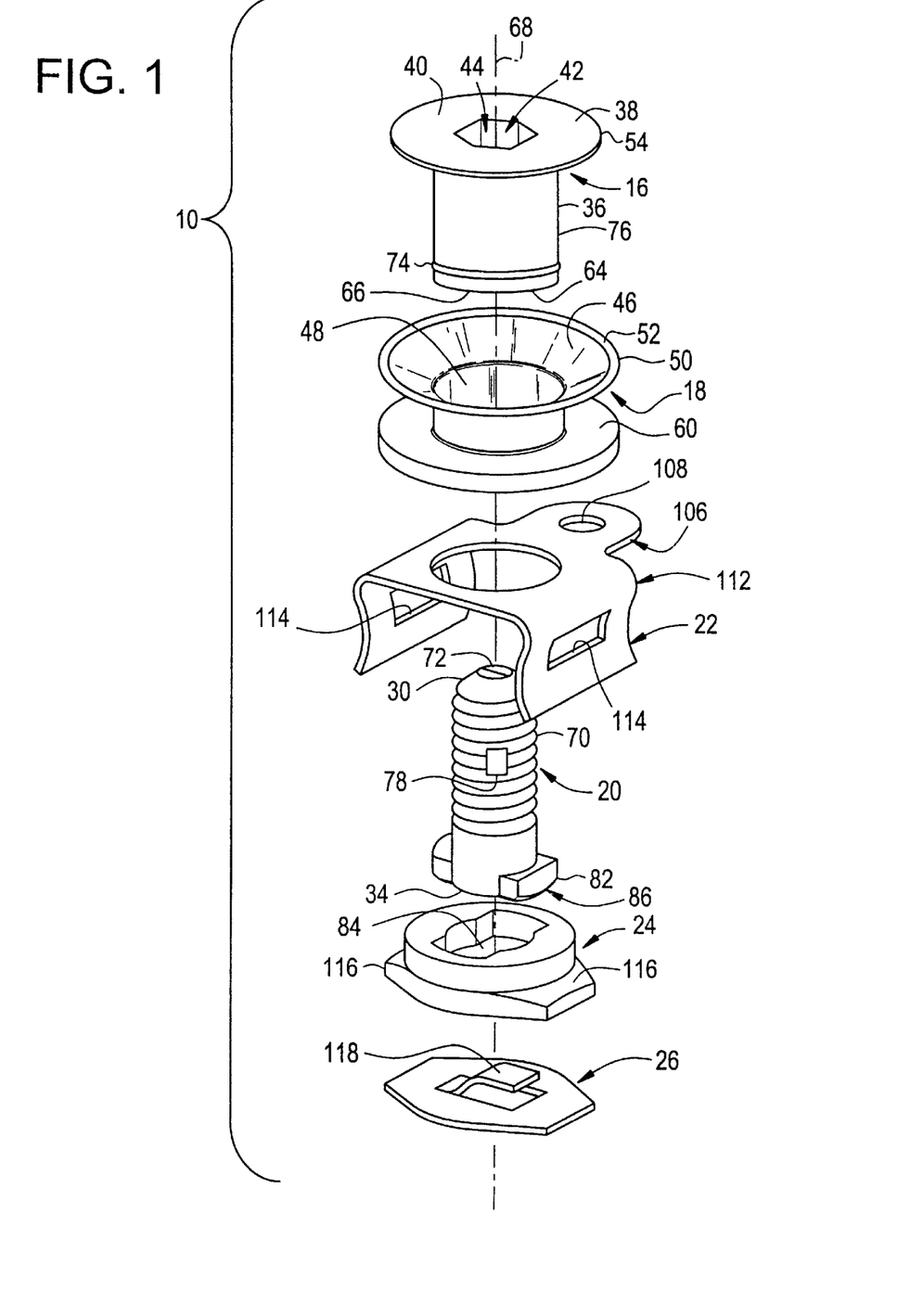
FIG. 1 is an axially exploded perspective view of a fastener assembly which is in accordance with an embodiment of the present invention.
Figure 2:
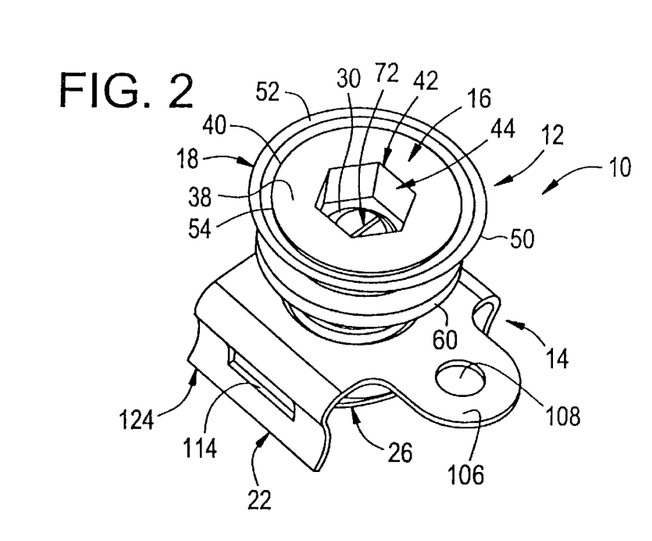
FIG. 2 is a top, perspective view of the fastener assembly illustrated in FIG. 1, showing the fastener assembly operatively assembled.

As shown in FIGS. 1–5, preferably the nut body 16 includes an enlarged head portion 38 at one end 40, and a shank portion 36 of the nut body 16 is generally cylindrically-shaped. Preferably the head portion 38 of the nut body 16 has tool-engaging structure 42 for engagement with a drive tool for driving or rotating the nut body 16. For example, as shown in FIGS. 1–3, the tool-engaging structure 42 may consist of an opening which is configured for engagement with a standard hex tool, for example with a 4 mm hex tool. Alternatively, the tool-engaging structure 42 may be a wrenching slot configured for engagement with a standard screwdriver or be some other structure which is configured for engagement with some other tool for driving or rotating the nut body 16.

Preferably an opening 44 is provided on the head portion 38, and the opening 44 defines a window through which the rotational position of the stud 20 relative to the nut body 16 can be viewed (see FIG. 2). As shown in FIG. 2, the opening 44 and the tool-engaging structure 42 on the head portion 38 of the nut body 16 may be one in the same. However, this is not necessarily the case. For example, if the tool-engaging structure 42 is configured for engagement with a standard screwdriver, the tool-engaging structure 42 may extend across the opening 44 on the head portion 38 which provides the viewing window.

The retainer component 18 of the stud assembly 12 may consist of a grommet. Preferably an interior surface 46 of the retainer 18 generally corresponds to the exterior surface 76 of the nut body 16 such that a central bore 48 of the retainer 18 can receive the nut body 16 as shown in FIGS. 2–5, yet the nut body 16 can be at least partially withdrawn from the central bore 48. Preferably, a top portion 50 of the retainer 18 generally corresponds to the head portion 38 of the nut body 16 such that the head portion 38 of the nut body 16 generally seats in the top portion 50 of the retainer 18 when the stud assembly 12 is installed in the receptacle assembly 14. As shown in FIG. 5, when the stud assembly 12 is fully engaged with the receptacle assembly 14 (i.e. the stud 20 is fully engaged in the receptacle 24), preferably an edge 52 of the top portion 50 of the retainer 18 and an edge 54 of the head portion 38 of the nut body 16 are generally flush with a surface 56 of the structural body 32 in which the stud assembly 12 is retained.

As discussed above, the stud assembly 12 is retained on the structural body 32. Specifically, as shown in FIG. 5, the retainer 18 is retained in an aperture 58 in the structural body 32, and the retainer 18 receives the nut body 16. The retainer 18 includes an outwardly extending flange 60 for engagement with a surface 62 of the structural body 32 while the top portion 50 of the retainer 18 engages surface 56 of the structural body 32 thereby securing the retainer 18 on the structural body 32. The securement preferably provides that when the stud assembly 12 is disengaged from the receptacle assembly 14, and the structural body 32 is withdrawn from structural body 28, the stud assembly 12 remains generally captively retained on the structural body 32.

As shown in FIG. 5, the end 64 of the nut body 16 which is opposite the head portion 38 has a threaded bore 66 formed therein, and the threaded bore 66 extends axially partially along a longitudinal axis 68 of the nut body 16 and communicates with the opening 44 in the head portion 38. The threaded bore 66 at the end 64 of the nut body 16 is configured for receiving a portion of the stud 20. Specifically, as shown in FIGS. 1 and 5–11, the stud 20 includes a threaded shaft portion 70, and it is this portion which is threadable into the threaded bore 66 at the end 64 of the nut body 16 (see FIG. 5). The communication between the threaded bore 66 and the opening 44 provides that one can view the rotational position of the stud 20 through the opening 44 by viewing alignment indicia 72, such as a groove, on the end 30 of the stud 20. By viewing the alignment indicia 72, one can assess whether the stud 20 is fully secured in the receptacle 24.

As shown in FIGS. 1 and 3–5, a retaining member 74 is provided on the external surface 76 of the nut body 16 adjacent the end 64 of the nut body 16. The retaining member 74 may consist of, for example, a nylon patch or other elastomer member or band which circumscribes the external surface 76 of the nut body 16. As will be described more fully later herein, the retaining member 74 provides frictional engagement with the interior surface 46 of the retainer 18 when the nut body 16 is sufficiently withdrawn from the central bore 48 of the retainer 18 when the stud assembly 12 is disengaged from the receptacle assembly 14 (i.e. the stud 20 is not engaged in the receptacle 24). This frictional engagement between the retaining member 74 and the interior surface 46 of the retainer 18 provides that the nut body 16 does not tend to shift in the central bore 48 of the retainer 18, for example, as a result of gravity of movement of the structural body 32, and this provides that the stud 20 is better aligned and retained in a retracted position for re-insertion in the receptacle 24.

Preferably, friction-enhancing structure 78 is provided on at least one of the threaded shaft portion 70 of the stud 20 or an internal wall 80 of the nut body 16 which defines the threaded bore 66 for enhancing a friction fit between the threaded shaft portion 70 of the stud 20 and the threaded bore 66 of the nut body 16 when the threaded shaft 70 and bore 66 are threadably inter-engaged as shown in FIGS. 2–5. As shown in FIGS. 1, 6–8 and 10, the friction-enhancing structure 78 may be, for example, a nylon patch disposed on the threaded shaft portion 70 of the stud 20. As will be described more fully later herein, the friction-enhancing structure 78 ensures that the stud 20 rotates along with the nut body 16 when the nut body 16 is rotated, unless the stud 20 is being kept by the receptacle 24 from rotating along with the nut body 16.

Instead of providing that the stud 20 includes a threaded shaft portion 70 and the nut body 16 includes a threaded bore 66, it is possible to provide that the nut body 16 includes a threaded shaft portion (instead of a threaded bore 66) extending from the end 64 of the nut body 16 and that the stud 20 includes a threaded bore (instead of a threaded shaft portion 70) for receiving the threaded shaft portion extending from the end 64 of the nut body 16. Again, in this case, friction-enhancing structure 78, such as a nylon patch, can be provided on at least one of the threaded shaft portion of the nut body 16 or the threaded bore in the stud 20.

Figure 11:
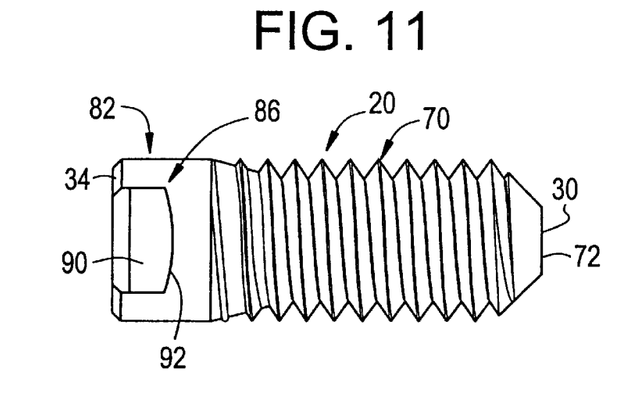
FIG. 11 is a top, plan view of the stud illustrated in FIG. 10.
Figure 12:
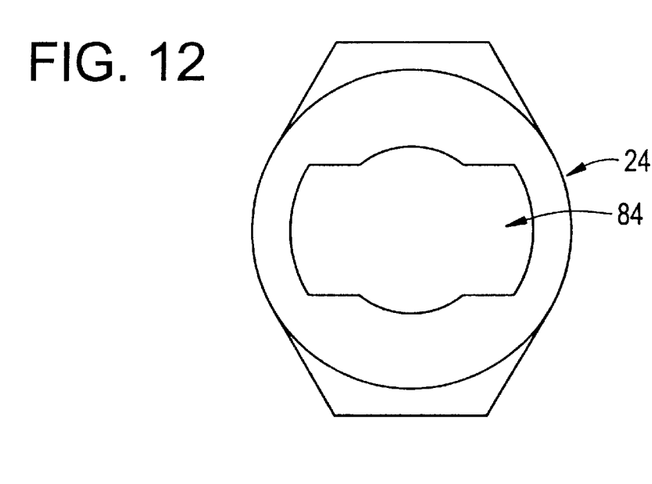
FIG. 12 is an enlarged, top, plan view of a receptacle component of the fastener assembly illustrated in FIGS. 1–5.
Figure 13:
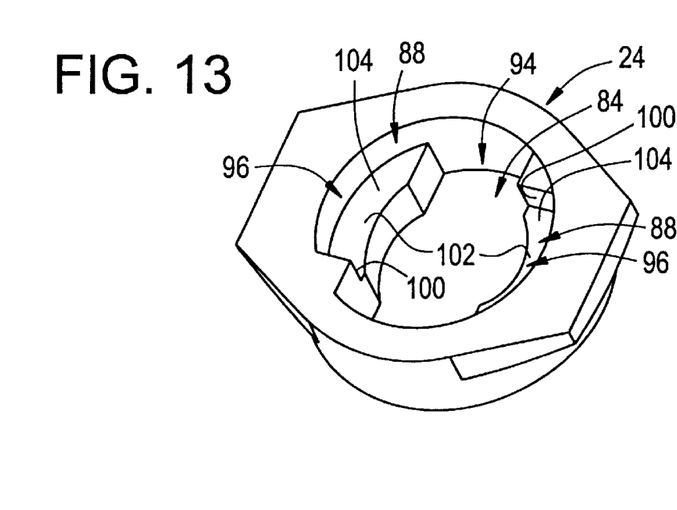
FIG. 13 is a bottom, left perspective view of the receptacle illustrated in FIG. 12.
Figure 14:
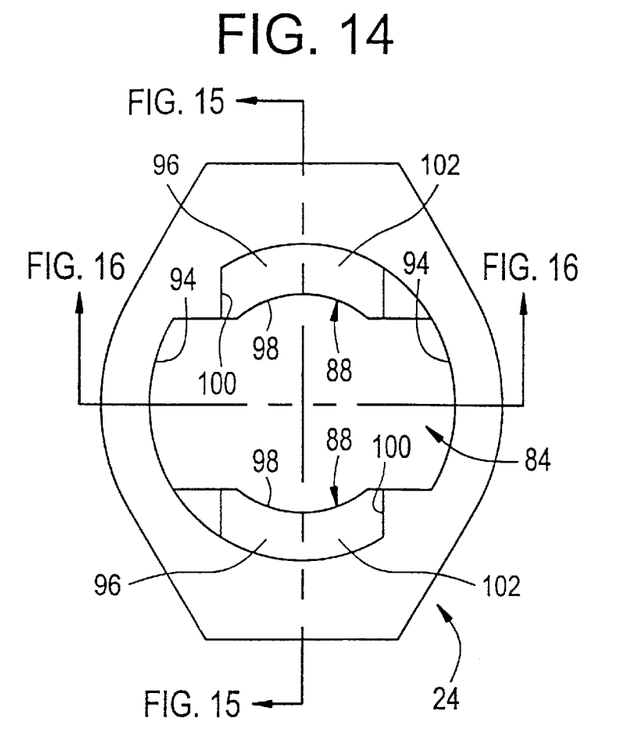
FIG. 14 is a bottom, plan view of the receptacle illustrated in FIG. 12.
Figure 15:
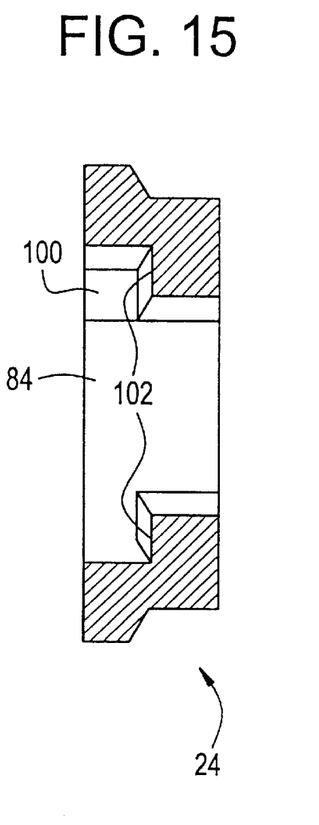
FIG. 15 is a side, cross-sectional view, taken along line 15—15, of the receptacle shown in FIG. 14.
Figure 16:
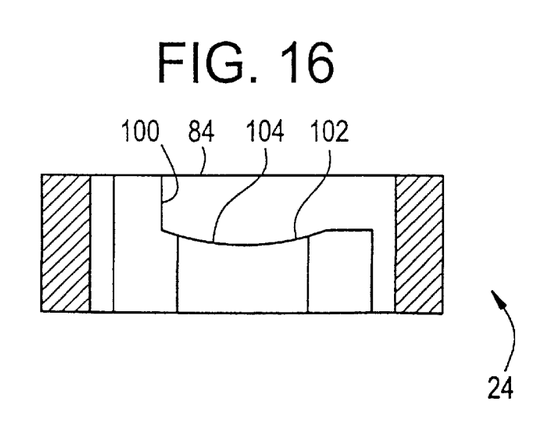
FIG. 16 is a side, cross-sectional view, taken along line 16—16, of the receptacle shown in FIG. 14.

As discussed above, the end 34 of the stud 20 is engageable with the receptacle 24. Specifically, as shown in FIGS. 1 and 5–11, the stud 20 has a receptacle-engaging portion 82 which is opposite the threaded shaft portion 70. The receptacle-engaging portion 82 of the stud 20 has a shape which generally corresponds to an opening 84 in the receptacle 24. The receptacle-engaging portion 82 of the stud 20 includes structure for engaging corresponding structure provided in the receptacle 24 to provide that the stud 20 can be retained in the receptacle 24. The structure provided on the stud 20 may be one or more key structures 86 for engaging keyway structures 88 provided in the receptacle 24. Specifically, the key structures 86 on the receptacle-engaging portion 82 of the stud 20 may consist of two oppositely-spaced protrusions 90 which are adjacent the end 34 of the stud 20 for insertion in corresponding passageways in the receptacle. As shown in FIG. 11, the protrusions 90 may have convex surfaces 92 for engaging corresponding concave structure in the receptacle 24, as will be described later herein.

Figure 6:
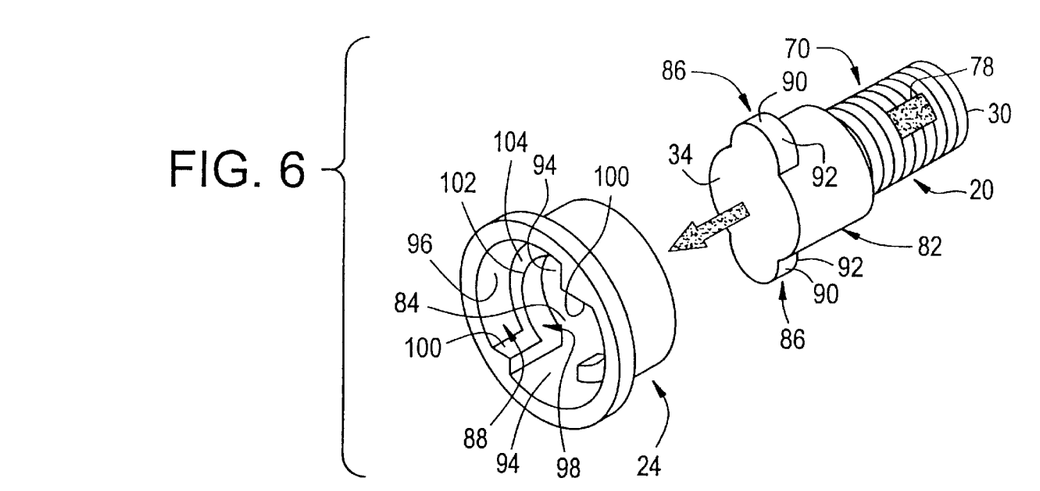
FIG. 6 is a perspective view of a stud and a receptacle of the fastener assembly similar to that as illustrated in FIGS. 1–5, showing the stud being generally axially inserted into the receptacle.
Figure 7:
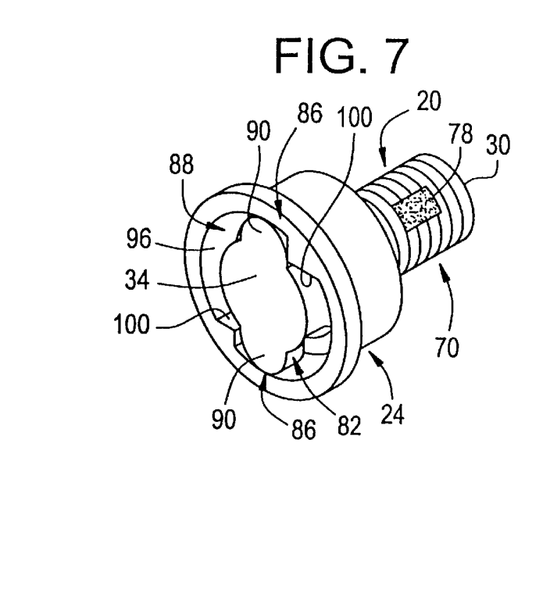
FIG. 7 is a perspective view, similar to that of FIG. 6, of the stud and receptacle of the fastener assembly similar to that as illustrated in FIGS. 1–5, showing the stud generally axially inserted into the receptacle.
Figure 8:
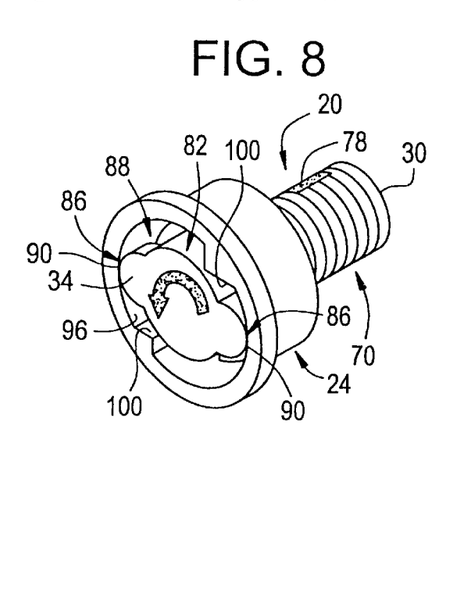
FIG. 8 is a perspective view, similar to that of FIGS. 6 and 7, of the stud and receptacle of the fastener assembly similar to that as illustrated in FIGS. 1–5, showing the stud axially inserted into the receptacle and being rotated with respect to the receptacle.
Figure 9:
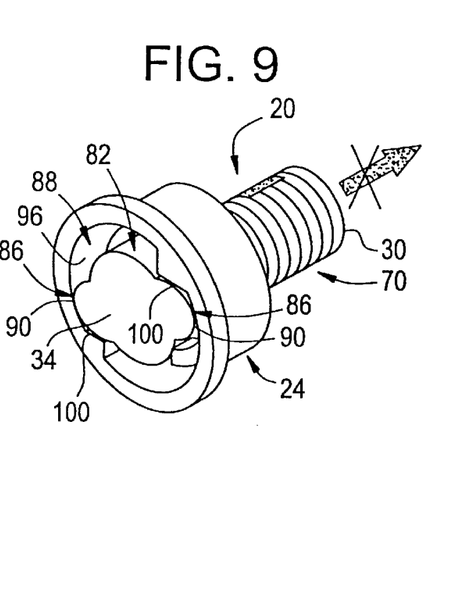
FIG. 9 is a perspective view, similar to that of FIGS. 6–8, of the stud and receptacle of the fastener assembly similar to that as illustrated in FIGS. 1–5, showing the stud axially inserted into the receptacle and fully rotated with respect thereto.
Figure 10:
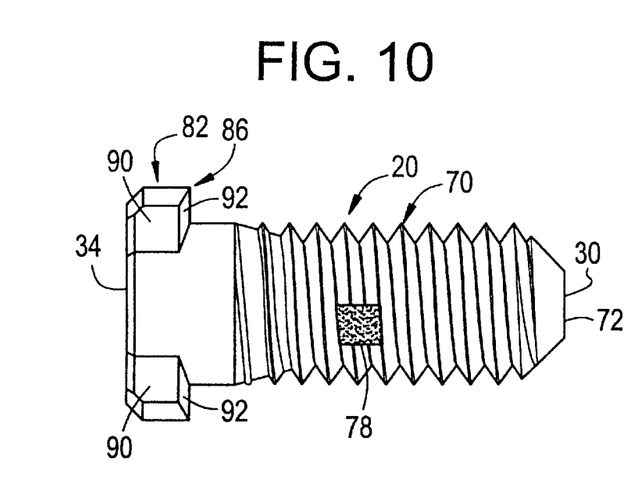
FIG. 10 is an enlarged, side, elevational view of a stud component of the fastener assembly illustrated in FIGS. 1–5.

With reference to FIGS. 6–9 and 12–16, the keyway structures 88 in the receptacle 24 are preferably two passageways which are identical to each other. Preferably, each passageway includes an axial passageway 94 in communication with a transverse passageway 96, where the axial passageway 94 is a passageway which extends generally axially along at least a portion of the receptacle 24, and the transverse passageway 96 is a passageway which extends at least partially about the circumference of an interior surface of the receptacle 24. Each of the passageways 94, 96 is defined by a wall 98, and each axial passageway 94 receives one of the protrusions 90 on the receptacle-engaging portion 82 of the stud 20 when the receptacle-engaging portion 82 of the stud 20 is generally axially inserted into the opening 84 in the receptacle 24, as shown in FIGS. 6. Upon further axial insertion of the receptacle-engaging portion 82 of the stud 20 into the opening 84 in the receptacle 24, the protrusions 90 on the stud 20 travel along the axial passageways 94 until the protrusions 90 eventually reach the transverse passageways 96, as shown in FIG. 7. In this position, clockwise rotation of the stud 20, as shown in FIG. 8, with respect to the receptacle 24 causes the protrusions 90 on the stud 20 to travel along the transverse passageways 96 until the protrusions 90 contact stop walls 100, as shown in FIG. 9, which define the end of the transverse passageways 96.

As shown in FIGS. 6, 13, 14 and 16, the stop walls 100 intersect retaining walls 102 which at least partially define the transverse passageways 96. In fact, the stop walls 100 along with the retaining walls 102 define the transverse passageways 96. When the stud 20 has been fully rotated with respect to the receptacle 24, as shown in FIGS. 2–5 and 9, the stud 20 is retained therein by the retaining walls 102 via contact with the protrusions 90 on the stud 20. Preferably the shape of an internal surface 104 of each retaining wall 102 (compare FIG. 11 and FIG. 16) generally corresponds to the surfaces 92 of the protrusions 90 on the stud 20. Specifically, preferably the surfaces 92 of the protrusions 90 are generally convex while the corresponding internal surfaces 104 of the retaining walls 102 are generally concave.

The contact between the protrusions 90 on the stud 20 and the retaining walls 102 in the receptacle 24 after the stud 20 has been inserted and rotated in the receptacle 24, as shown in FIG. 9, prevents the stud 20 from being substantially axially withdrawn from the receptacle 24 unless the stud 20 is first rotated back with respect to the receptacle 24 to cause the protrusions 90 on the stud 20 to re-align with the axial passageways 94 in the receptacle 24, as shown in FIG. 7. At that time, the stud 20 can be freely axially withdrawn from the opening 84 in the receptacle 24.

As discussed above, preferably the surfaces 92 of the protrusions 90 are generally convex, and the internal surfaces 104 of the retaining walls 102 in the receptacle 24 are generally concave. As a result of the engagement between the surfaces 92 and 104, the stud 20 does not have a tendency to rotate within the receptacle once the stud assembly 12 has been installed in the receptacle assembly 14.

As discussed above, the retaining clip 22 is preferably secured to the structural body 28 (see FIGS. 4 and 5). As shown in FIGS. 1, 2 and 4, the retaining clip 22 preferably includes an arm 106 that has an aperture 108 formed therein, and the aperture 108 preferably receives a rivet 110 (see FIG. 4) or some other fastening means for fastening the retaining clip 22 to the structural body 28. Preferably, a main body portion 112 of the retaining clip 22 includes apertures 114 which receive an outwardly extending portion 116 of the receptacle 24 such that the receptacle 24 floats therein. Therefore, the receptacle 24 can be generally retained relative to the structural body 28 to which the retaining clip 22 is secured. Preferably the apertures 114 in the main body portion 112 of the retaining clip 22 are configured to receive the biasing member 26 as well as the receptacle 24. Alternatively, the main body portion 112 of the retaining clip 22 may include separate apertures for retaining the biasing member 26.

As shown in FIG. 1, the biasing member 26 may be a leaf spring which includes a biased lever portion 118 which abuts the portion 34 of the stud 20 when the stud 20 is installed in the receptacle 24 (see FIGS. 3 and 5). When the protrusions 90 are engaged in the receptacle 24, the biasing member 26 creates a biasing force to urge the convex portions into the corresponding concave portions to further prevent disengagement of the stud 20 from the receptacle 24. This engagement also causes the biasing member 26 to urge the stud assembly 12 at least partially out of the receptacle 24 when the stud 20 is in the position shown in FIG. 7—when the protrusions 90 on the stud 20 are aligned with the axial passageways 94 in the receptacle 24. This provides for faster removal of the stud 20 from the receptacle 24. Additionally, in the case where the stud assembly 12 is not being intentionally dis-engaged from the receptacle assembly 14 but the protrusions 90 on the stud 12 have become aligned with the axial passageways 94 in the receptacle 24, this urging by the biasing member 26 on the stud 20 can cause the stud 20 to be at least partially ejected from the receptacle 24 causing the head portion 38 of the nut body 12 to no longer be flush with the surface 56 of the second structural body 32 in which the stud assembly 12 is retained thereby providing a visual indication that the stud assembly 12 is no longer installed in the receptacle assembly 14 with the protrusions 90 being retained behind the retaining walls 104.

The fastening of the stud assembly 12 to the receptacle assembly 14 to attach the second structural body 32 to the first structural body 28 will now be described. Initially, the nut body 16 is inserted in the retainer 18 which is retained on the structural body 28. Then, the threaded shaft portion 70 of the stud 20 is threadably engaged in the threaded bore 66 in the nut body 16. The insertion of the nut body 16 into the retainer 18 and the threading of the stud 20 into the nut body 16 may be performed, for example, only once, during the assembly of a panel.

Subsequently, the receptacle-engaging portion 82 of the stud 20 is inserted into the opening 84 in the receptacle 24 and rotated as shown in FIGS. 6–9. Rotation of the receptacle-engaging portion 82 in the receptacle 24 is preferably effected by using a tool (in association with the tool-engaging structure 42) to rotate the nut body 16. Rotation of the nut body 16 results in rotation of the stud 20 because friction between the receptacle-engaging portion 82 of the stud 20 and the receptacle 24 is less than the friction between the nut body 16 and the stud 20. As discussed above, friction-enhancing structure 78 may be utilized between the stud 20 and the nut body 16 to ensure that the stud 20 rotates along with the nut body 16 when the nut body 16 is rotated.

It is preferred that the nut body 16 not be fully threaded onto the stud 20, and instead only be partially threaded onto the stud 20, before the receptacle-engaging portion 82 of the stud 20 is inserted into the receptacle 24. After the receptacle-engaging portion 82 of the stud 20 has been inserted into the receptacle 24 and rotated (preferably by using the nut body 16) such that the protrusions 90 contact the stop walls 100, preferably a further quarter turn (90°) of the nut body 16 results in the nut body 16 further threading onto the threaded shaft portion 70 of the stud 20. As the nut body 16 is further rotated after the protrusions 90 contact the stop walls 100, the stud 20 does not continue to rotate in the receptacle 24 because of the protrusions 90 on the stud 20 contacting the stop walls 100 of the transverse passageways 96 of the receptacle 24. The stop walls 100 work to provide that when the nut body 16 is then further rotated, the nut body 16 rotates with respect to the stud 20 and further threadably engages thereon thereby causing the fastener assembly 10 to become fully installed with the structural bodies 28 and 32 clamped together. Preferably, when the stud assembly 12 is fully installed in the receptacle assembly 14, the head portion 38 of the nut body 16 is generally flush with the surface 56 of the structural body 32.

To release the stud assembly 12 from the receptacle assembly 14, the nut body 16 is turned in the opposite direction to cause the protrusions 90 to move in the transverse passageways 96 in the receptacle 24 and re-align with the axial passageways 94 as shown in FIG. 7. Thereafter, the stud assembly 12 can be dis-engaged from the receptacle assembly 14 merely by withdrawing the stud assembly 12 from the receptacle assembly 14 (more specifically, by withdrawing the stud 20 from the opening 84 in the receptacle 24).

When the fastener assembly 10 is fully installed (i.e. the stud assembly 12 is fully secured in the receptacle assembly 14), the stud assembly 12 does not have a tendency to vibrate loose possibly causing the protrusions 90 to shift and re-align with the axial passageways 94. This is due to the frictional and clamping forces which exist between the surfaces 92 of the protrusions 90 and the internal surfaces 104 of the retaining walls 102 when the stud assembly 12 is installed. Preferably, the nut body 16 is sufficiently further rotated after the protrusions 90 on the stud 20 contact the stop walls 100 to provide adequate clamping forces between the stud and fastener assemblies 12 and 14, respectively.

As discussed, preferably the surfaces 92 of the protrusions 90 are convex as shown in FIG. 11, and the internal surfaces 104 of the retaining walls 102 are concave. This configuration further provides that the protrusions 90 are secured by the retaining walls 102 and prevented from unintentionally rotating and re-aligning with the axial passageways 94. In fact, during release of the stud assembly 12 from the receptacle assembly 14 when the nut body 16 is initially rotated (preferably by using a corresponding tool), the engagement between the surfaces 92 and 104 provides that the stud 20 is initially prevented from rotating with the nut body 16, and the nut body 16 rotates with respect to the stud 20. Once the nut body 16 has been rotated enough to provide that the stud 20 can move generally axially enough into the opening 84 in the receptacle 24 to allow the surfaces 92 of the protrusions 90 to clear the internal surfaces 104 of the retaining walls 102, further rotation of the nut body 16 in the same direction causes the stud 20 to move along with the nut body 16 until the protrusions 90 re-align with the axial passageways 94 at which time the stud assembly 12 can be removed from the receptacle assembly 14 (i.e. the stud 20 removed from the receptacle 24). Preferably, a one-quarter turn of the nut body 16 causes the surfaces 92 and 104 to disengage from each other enough to allow the stud 20 to begin to rotate along with the nut body 16. Subsequently, preferably another quarter turn of the nut body 16 in the same direction causes the protrusions 90 to become aligned with the axial passageways 94. Hence, the stud assembly 12 is preferably fully installed in the receptacle assembly 14 after the receptacle-engaging portion 82 of the stud 20 is inserted in the receptacle 24 and the nut body 16 is rotated a one-half or 180° turn. Likewise, the stud assembly 12 is preferably releasable from the receptacle assembly 14 after the stud assembly 12 has been installed therein by rotating the nut body 16 a one-half or 180° turn in the opposite direction.

Once the stud assembly 12 is released from the receptacle assembly 14 (i.e. the stud 20 removed from the receptacle 24), the structural body 32 can be moved away from the other structural body 28 (unless of course multiple fasteners are used to attach the structural body 32 to the structural body 28 in which case all the fasteners would first need to be released). Once the stud assembly 12 has been released or removed from the receptacle assembly 14, the nut body 16 may be partially withdrawn out of the central bore 48 in the retainer 18 causing the retaining member 74 on the external surface 76 of the nut body 16 to frictionally engage the interior surface 46 of the retainer 18. This causes the nut body 16 to be maintained substantially coaxially with the retainer 18, as opposed to allowing the nut body 16 to shift therein, for example in response to gravity. As a result, the stud 20 is maintained in a retracted position which provides for easy re-insertion in the receptacle 24.

With regard to materials of the different components of the fastener assembly 10, the nut body 16, retainer 14 and receptacle 24 are preferably comprised of titanium while the stud 20, retaining clip 22 and biasing member 26 are preferably comprised of stainless steel. The titanium components provide lightweight strong materials and the stainless steel components provide high strength structural components to provide a structural connect between the first and second structural bodies 28 and 32. Of course, other materials may be employed in connection with the present invention.

The fastener assembly 10 provides several advantages. For example, installation and removal of the stud assembly 12 with regard to the receptacle assembly 14 is relatively easy to accomplish, and can be accomplished relatively quickly. Furthermore, relatively substantial clamping forces can be obtained once the stud assembly 12 is fully installed, and the configuration of the fastener assembly 10 provides that the stud assembly 12 does not tend to vibrate out of engagement with the receptacle 24. Additionally, the fastener assembly 10 provides these advantages without having to employ several components, such as several small components which are easy to lose.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

What is claimed is:

1. A quick-release fastener system comprising: a stud assembly and a receptacle assembly, said stud assembly including a stud and a nut body engaged with said stud, said receptacle assembly including a retaining clip and a biasing member and receptacle which are engaged with said retaining clip, said stud including a receptacle-engaging portion which engages said receptacle, said nut body engaged with said stud such that rotation of said nut body effects rotation of said receptacle-engaging portion of said stud in said receptacle thereby effecting retention of said receptacle-engaging portion in said receptacle, said biasing member contacting said stud and biasing said receptacle-engaging portion of said stud into engagement with said receptacle, said stud assembly including a retainer providing a central bore, said nut body received in said central bore, said stud assembly configured such that said nut body is generally captive in said central bore of said retainer when said receptacle-engaging portion is disengaged from said receptacle.

2. A quick-release fastener system as recited in claim 1 further comprising a retaining member disposed on an external surface of said nut body.

3. A quick-release fastener system comprising: a stud assembly and a receptacle assembly, said stud assembly including a stud and a nut body engaged with said stud, said receptacle assembly including a retaining clip and a biasing member and receptacle which are engaged with said retaining clip, said stud including a receptacle-engaging portion which engages said receptacle, said nut body engaged with said stud such that rotation of said nut body effects rotation of said receptacle-engaging portion of said stud in said receptacle thereby effecting retention of said receptacle-engaging portion in said receptacle, said biasing member contacting said stud and biasing said receptacle-engaging portion of said stud into engagement with said receptacle, said nut body including a window through which an end of said stud is viewable, said window comprising tool-engaging structure.

4. A quick-release fastener system comprising: a stud assembly and a receptacle assembly, said stud assembly including a stud and a nut body engaged with said stud, said receptacle assembly including a retaining clip and a biasing member and receptacle which are engaged with said retaining clip, said stud including a receptacle-engaging portion which engages said receptacle, said nut body engaged with said stud such that rotation of said nut body effects rotation of said receptacle-engaging portion of said stud in said receptacle thereby effecting retention of said receptacle-engaging portion in said receptacle, said biasing member contacting said stud and biasing said receptacle-engaging portion of said stud into engagement with said receptacle, said retaining clip providing apertures in which said receptacle and said biasing member are engaged.

5. A quick-release fastener system comprising: a stud assembly and receptacle assembly, said stud assembly including a retainer providing a central bore, said stud assembly including a stud and nut body which is received in said central bore in said retainer, said nut body engaged with said stud, said stud including receptacle-engaging portion which engages said receptacle, said stud assembly configured such that said nut body is generally captive in said central bore in said retainer when said receptacle-engaging portion is disengaged from said receptacle, said nut body engaged with said stud such that rotation of said nut body effects rotation of said receptacle-engaging portion of said stud in said receptacle, further comprising a retaining member disposed on an external surface of said nut body, said nut body including a window through which an end of said stud in viewable.

6. A quick-release fastener system comprising: a stud assembly and a receptacle assembly, said stud assembly including a retainer providing a central bore, said stud assembly, including a stud and a nut body which is received in said central bore in said retainer, said nut body engaged with said stud, said stud including a receptacle-engaging portion which engages said receptacle, said stud assembly configured such that said nut body is generally captive in said central bore in said retainer when said receptacle-engaging portion is disengaged from said receptacle, said nut body engaged with said stud such that rotation of said nut body effects rotation of said receptacle-engaging portion of said stud in said receptacle, said nut body including a window through which an end of said stud is viewable.

7. A quick-release fastener system as recited in claim 6, said window comprising tool-engaging structure.

8. A quick-release fastener system as recited in claim 7, said retaining member providing apertures in which said receptacle and a biasing member are engaged.

9. A quick-release fastener system as recited in claim 6, said receptacle-engaging portion of said stud including protrusions that provide convex surfaces which engage with corresponding concave surfaces of said receptacle.

10. A quick-release fastener system as recited in claim 6, wherein said stud and said nut body are threadably engaged, and wherein friction-enhancing structure is provided on at least one of said stud and said nut body.

11. A quick-release fastener system comprising: a stud assembly and a receptacle assembly, said stud assembly including a retainer providing a central bore, said stud assembly including a stud and a nut body which is received in said central bore in said retainer, said nut body threadably engaged with said stud, a retaining member disposed on an external surface of said nut body, said stud including a receptacle-engaging portion which engages said receptacle, said stud assembly configured such that said nut body is generally captive in said central bore in said retainer when said receptacle-engaging portion is disengaged from said receptacle, said nut body engaged with said stud such that rotation of said nut body effects rotation of said receptacle-engaging portion of said stud in said receptacle, said nut body including a window through which an end of said stud is viewable, said window comprising tool-engaging structure, said receptacle-engaging portion of said stud including protrusions that provide convex surfaces which engage with corresponding, concave surfaces of said receptacle, said retaining clip providing apertures in which said receptacle and said biasing member are engaged.

* * * * *

UNITED STATES PATENT AND TRADEMARK OFFICE
CERTIFICATE OF CORRECTION

PATENT NO. : 6,261,042 B1
DATED : July 17, 2001
INVENTOR(S) : John D. Pratt

It is certified that error appears in the above-identified patent and that said Letters Patent is hereby corrected as shown below:

<u>Column 11,</u>
Line 26, "in viewable" should read -- is viewable --

Signed and Sealed this

Twenty-sixth Day of February, 2002

*Attest:*

JAMES E. ROGAN
*Attesting Officer*   *Director of the United States Patent and Trademark Office*